(12) United States Patent
Merchant et al.

(10) Patent No.: US 10,664,703 B2
(45) Date of Patent: May 26, 2020

(54) VIRTUAL TRADING CARD AND AUGMENTED REALITY MOVIE SYSTEM

(71) Applicants: Damon C. Merchant, Southfield, MI (US); Lortensia Merchant, Southfield, MI (US)

(72) Inventors: Damon C. Merchant, Southfield, MI (US); Lortensia Merchant, Southfield, MI (US)

( * ) Notice: Subject to any disclaimer, the term of this patent is extended or adjusted under 35 U.S.C. 154(b) by 0 days.

(21) Appl. No.: 15/870,016

(22) Filed: Jan. 12, 2018

(65) Prior Publication Data

US 2018/0204060 A1 Jul. 19, 2018

Related U.S. Application Data

(60) Provisional application No. 62/445,280, filed on Jan. 12, 2017, provisional application No. 62/449,658, filed on Jan. 24, 2017.

(51) Int. Cl.
| | |
|---|---|
| *G06K 9/00* | (2006.01) |
| *H04N 21/4223* | (2011.01) |
| *G06K 7/14* | (2006.01) |
| *H04N 21/81* | (2011.01) |
| *G06T 11/60* | (2006.01) |
| *H04N 21/44* | (2011.01) |
| *G06K 19/06* | (2006.01) |
| *H04N 21/414* | (2011.01) |
| *A63F 13/825* | (2014.01) |
| *A63F 13/92* | (2014.01) |

(Continued)

(52) U.S. Cl.
CPC ........ *G06K 9/00671* (2013.01); *A63F 13/213* (2014.09); *A63F 13/80* (2014.09); *A63F 13/825* (2014.09); *A63F 13/92* (2014.09); *G06K 7/1417* (2013.01); *G06K 9/00711* (2013.01); *G06K 19/06037* (2013.01); *G06T 11/60* (2013.01); *H04N 21/41407* (2013.01); *H04N 21/4223* (2013.01); *H04N 21/4312* (2013.01); *H04N 21/44008* (2013.01); *H04N 21/4781* (2013.01); *H04N 21/8133* (2013.01)

(58) Field of Classification Search
None
See application file for complete search history.

(56) References Cited

U.S. PATENT DOCUMENTS

| | | | |
|---|---|---|---|
| 2003/0037075 A1* | 2/2003 | Hannigan | G06Q 30/02 715/201 |
| 2009/0054124 A1* | 2/2009 | Robbers | A63F 1/00 463/9 |

(Continued)

OTHER PUBLICATIONS

Edgaras ("Augmented Reality Tutorial No. 34: Screenshot of Augmented Reality View and Sharing it on Facebook", https://www.youtube.com/watch?v=nSeljSH6YSk, 2015) (Year: 2015).*

*Primary Examiner* — Xin Sheng
(74) *Attorney, Agent, or Firm* — The Weintraub Group, P.L.C.

(57) ABSTRACT

The present invention provides a virtual trading card system for capturing and storing at least one virtual trading card on a mobile device. The present invention provides a method for capturing and storing at least one virtual trading card on a mobile device. The present invention also provides an augmented reality (AR) movie system for displaying an AR image on a mobile device as a visual overlay atop a video signal.

3 Claims, 7 Drawing Sheets

(51) Int. Cl.
  *H04N 21/478*  (2011.01)
  *H04N 21/431*  (2011.01)
  *A63F 13/213*  (2014.01)
  *A63F 13/80*  (2014.01)

(56) References Cited

U.S. PATENT DOCUMENTS

| | | | | |
|---|---|---|---|---|
| 2013/0257907 A1* | 10/2013 | Matsui | ............... | G09G 5/377 |
| | | | | 345/633 |
| 2014/0210858 A1* | 7/2014 | Kim | ............... | G06F 3/147 |
| | | | | 345/633 |
| 2014/0225919 A1* | 8/2014 | Kaino | ............... | G06T 19/006 |
| | | | | 345/633 |
| 2015/0249872 A1* | 9/2015 | Lee | ............... | G06Q 30/06 |
| | | | | 725/32 |
| 2015/0302623 A1* | 10/2015 | Ishikawa | ............... | G06K 9/2063 |
| | | | | 345/629 |

\* cited by examiner

VIRTUAL TRADING CARD AND AUGMENTED REALITY MOVIE SYSTEM

CROSS-REFERENCE TO RELATED APPLICATIONS

This application is a completion application of U.S. Provisional Patent Application Ser. Nos. 62/445,280 for AUGMENTED REALITY MOVIE SYSTEM AND METHOD FOR USING, filed Jan. 12, 2017 and 62/449,658 for VIRTUAL TRADING CARD SYSTEM AND METHOD FOR USING, filed Jan. 24, 2017 the disclosures of which are incorporated by reference in their entirety, including the drawings.

BACKGROUND OF THE INVENTION

1. Field of the Invention

The present invention pertains to augmented reality systems. More particularly, the present invention concerns a system and method for displaying augmented reality images during a screen-based viewing experience, such as a movie presentation, or a live-video broadcast of an event, such as a sporting match. And even more particularly, the present invention pertains to a system and method for making virtual trading cards accessible on mobile devices while viewing a live broadcast or a movie presentation.

2. Description of Related Art

With the developments in movie theater presentations aimed at providing an improved, interactive movie viewing experience to the viewers, movie theaters are typically including additional features for entertaining the viewers such as seats that deliver sound and motion effects to the viewers sitting thereupon, 3D special effects, and other more creative options.

Furthermore, in recent years, virtual or augmented reality devices have been at the forefront of technological innovation. The most popular application of these augmented reality devices includes a headset worn by a user who then experiences a preconstructed visual scene appearing as though right in front of them. The user is typically able to move his or her head and look around in all directions without losing sight of the scene. The headset tracks the user's movement and the scene adapts to any viewing changes in order to appear as if the user is fully immersed in the scene being watched. It is to be noted though that these devices are directed at providing their own visual display and do not modify any real-world images currently within the field of view of the user.

In order to improve upon the level of entertainment provided to a viewer of a movie presentation, it is envisioned that such augmented reality technology be incorporated into the movie presentation in a convenient manner without distracting the viewer from his or her viewing experience. Doing so requires cooperation between an augmented reality processing device, such as a mobile device having augmented reality capabilities, and the movie presentation itself.

The prior art has proposed potential solutions to this issue by providing apparatuses and/or methods for enhancing a viewing experience by using augmented reality devices. For example, U.S. Patent Application Publication No. 2015/0348329 to Carre et al., which published Dec. 3, 2015, teaches a system and method for displaying augmented reality images on a mobile device. An application is installed on the mobile device and provides a targeting advice area in a camera preview of the mobile device which recognizes a target identified therein. Based on the specific identified target, an event is triggered which provides augmented reality content to be displayed on the camera preview of the mobile device. The system and method taught therein describe the "event" as including expiration of a timer or instructions for a user in the form of displayable text messages based on the associated target scanned.

U.S. Patent Application Publication No. 2014/0002643 to Aziz et al., which published Jan. 2, 2014, also teaches a system and method for displaying augmented reality images on a mobile device. The system measures an amount of time a user spends capturing an image of an object with his or her mobile device and generates statistical data associated with the object. The system is specifically tailored to a retail environment for purposes of displaying advertisements associated with the object the mobile device is focusing on. More specifically, the system is directed to a bidding process wherein a company can bid on advertisement space associated with products in a retail environment.

U.S. Patent Application Publication No. 2008/0074424 to Carignano, which published May 27, 2008, teaches a system and method for superimposing an animated video content object onto a re-rendered version of a digital content object at a predefined position in the video content. Here, the animated video content object is captured by a camera on a mobile device. The digital content object is, then, superimposed into the captured video so as to appear as part of the originally captured video. Nevertheless, the display and positioning of the digital object within the captured video is predetermined by the user without any object recognition capabilities. Thus, there is no direct communication or interaction between the video content being captured by the camera of the mobile device and the subsequently displayed digital content, but, instead, at the sole control of the user.

U.S. Pat. No. 9,224,322 to Martellaro et al., which issued Dec. 29, 2015, teaches a system and method for decoding digital data embedded within multiple, consecutive frames of a movie. Here, a mobile device having a camera scans the encoded data in the form of a code, such as a Quick Response (QR) code or the like, that transmits image data directly to the mobile device. QR codes have a maximum binary capacity of 2,943 bytes and, based on the resolution of the camera, multiple QR codes can be simultaneously scanned to increase the data size and, thus, the quality of the images directly transmitted to the mobile device. While the system taught therein is beneficial for use in a movie theater where a network connection may be minimal, the system requires a mobile device with an extremely fast processor to process the amount of data from the code scanned. Further, the quality of the images is limited to the amount of data transmitted by each QR code.

Trading cards, originally referred to as "trade cards," have been in existence since 1875. These trading cards were sold by the Allen and Ginter tobacco company and, therefore, focused on subjects that appealed to men who smoked, such as actresses, baseball players, indian chiefs, boxers, and war.

In 1933, baseball cards began to be sold in bubble gum packages and included individual player biographies on the back of the baseball card. Typically, modern trading cards now include additional information such as statistics, previous teams the player was on, awards received, etc. and can be purchased as standalone sets.

Beginning as early as 2000 trading card companies began to introduce digital trading cards. The more popular digital trading card companies, including Topps, Panini, Sony, and Electronic Arts, launched computer programs, websites, and mobile applications to facilitate collecting and trading these virtual trading cards. Common features associated with virtual trading cards includes card auctioning, virtual shops, card tracking, and card trading between multiple users.

Virtual trading cards either function as an exclusively online medium or as a digital counterpart to a physical trading card. As an exclusively online medium, the virtual trading cards are typically acquired by purchasing the card from an online store or another user. Alternatively, where the virtual trading card is a digital counterpart to a physical trading card, the virtual trading card is usually obtained by entering an alphanumeric code or scanning a code, such as a Quick Response (QR) code or the like, found on the card. Once the code is scanned or entered, the virtual trading card is then saved to an electronic device such as a mobile device or a personal computer.

As is known to the skilled artisan, QR codes are a type of matrix barcode originally designed for the automotive industry in Japan. Now, QR codes have become popular sources of advertising by redirecting a user to a website or other location once the QR code is scanned by a mobile device. QR codes are oftentimes used to access virtual stores, provide payments, and numerous other purposes.

While it is well-known to scan QR codes to provide information, it is not taught in the prior art to combine the use of a scanned QR code with a virtual trading card in the manner described hereinbelow wherein a virtual trading card is generated in real-time based on the content of a screen-based presentation such as a live video-broadcast, or during a theatrical movie presentation.

Therefore, while each of the systems and methods disclosed in the above references are suitable for the uses and problems they intend to solve, there is an ongoing need for improvements in an augmented reality movie system and method for using same, such as one that can operate without a network connection and display augmented reality images, such as virtual trading cards, that directly interact with the movie presentation being viewed.

It is to this to which the present invention is directed.

SUMMARY OF THE INVENTION

As used herein, the term "virtual trading card" is defined as an electronic version of a typical trading card which can be captured by a mobile device and stored thereon for viewing and trading purposes. Further, as described herein, a virtual trading card may be stored and displayed as an AR image.

In a first aspect, the present invention provides a virtual trading card system for capturing and storing at least one virtual trading card on a mobile device. The system comprises: (a) a mobile device including: (i) a camera for capturing a video signal, the video signal including at least one code, the at least one code being associated with a virtual trading card; (ii) a display screen for displaying the associated virtual trading card; and (iii) a storage unit for storing the associated virtual trading card; (b) a downloadable mobile application installed on the mobile device, the application including: (i) a code recognition module for identifying the at least one code being displayed in the captured video signal; (ii) a code processing module for processing the at least one code and determining if a scheduling condition is satisfied; (iii) a card generation module for displaying the associated virtual trading card on the display screen of the mobile device if the scheduling condition is satisfied; and (iv) a storage module for storing the associated virtual trading card on the storage unit of the mobile device.

In a second aspect hereof, the present invention provides a method for capturing and storing at least one virtual trading card on a mobile device. The method comprises the steps of: (a) providing a mobile device including: (i) a camera for capturing a video signal, the video signal including at least one code, the at least one code being associated with a virtual trading card; (ii) a display screen for displaying the associated virtual trading card; (iii) a storage unit for storing the associated virtual trading card; (b) providing a downloadable mobile application for installation on the mobile device, once the application is activated, the application: (i) activating the camera on the mobile device; (ii) capturing a video signal; (iii) analyzing the video signal; (iv) identifying the at least one code in the captured video signal; (v) processing the at least one code; (vi) determining whether a scheduling condition is satisfied; (vii) displaying the associated virtual trading card on the display screen of the mobile device; and (viii) storing the associated virtual trading card on the storage unit of the mobile device.

In a third aspect, the present invention provides an augmented reality (AR) movie system for displaying an AR image on a mobile device as a visual overlay atop a video signal. The system comprises: (a) a mobile device comprising: (i) a camera for capturing or generating video signal within the field of view of the camera, the video signal including at least one marker; (ii) a display screen configured to simultaneously visually display at least one AR image and the captured video signal; (iii) a storage unit for storing the captured video signal; and (b) a downloadable mobile application installed on the mobile device, the application including: (i) a library comprising a plurality of AR images, each one of the plurality of AR images associated with a set of parameters defining instructions as to the position of each one of the plurality of AR images in relation to the at least one marker in the video signal; (ii) an input recognition module for recognizing the at least one marker in the video signal; (iii) an input processing module for selecting at least one of the plurality of AR images corresponding to the at least one marker recognized by the input recognition module; (iv) an AR image generation module for displaying the selected one of the plurality of AR images on the display screen of the mobile device as a visual overlay atop the captured video signal, the AR image generation module maintaining the position of the displayed AR image in relation to the at least one marker as the marker moves within the field of view of the camera; (v) a user interaction module for adjusting the position of the displayed AR image based on a user input; and (vi) a storage module for storing the displayed AR image and the captured video signal on the storage unit of the mobile device.

It is possible that more than one AR image may be associated with a single marker. In such situation then an AR image might be displayed alone or in combination with another AR Image depending upon the marker that is recognized in the video signal.

In a fourth aspect hereof, the present invention provides a method for displaying an AR image on a mobile device as a visual overlay atop a video signal. The method comprises the steps of: (a) providing a mobile device including: (i) a camera for capturing a video signal within the field of view of the camera; (ii) a display screen for displaying the captured video signal; (iii) a storage unit for storing the captured video signal; (b) providing a downloadable mobile application for installation on the mobile device, the application including a plurality of AR images; (c) downloading the application on the mobile device; (d) opening the application; (e) capturing a video signal; (f) identifying a marker in the captured video signal; (g) displaying one of the plurality of AR images associated with the marker on the display screen of the mobile device; (h) maintaining the position of the displayed AR image in relation to the marker; (i) altering the position of the displayed AR image based on a physical interaction; and (j) removing the displayed AR image from the display screen.

For a better understanding of the present invention, reference is made to the accompanying drawings and detailed description. In the drawings, like reference numerals refer to like parts through the several views, in which:

DETAILED DESCRIPTION OF THE INVENTION

Figure 1:
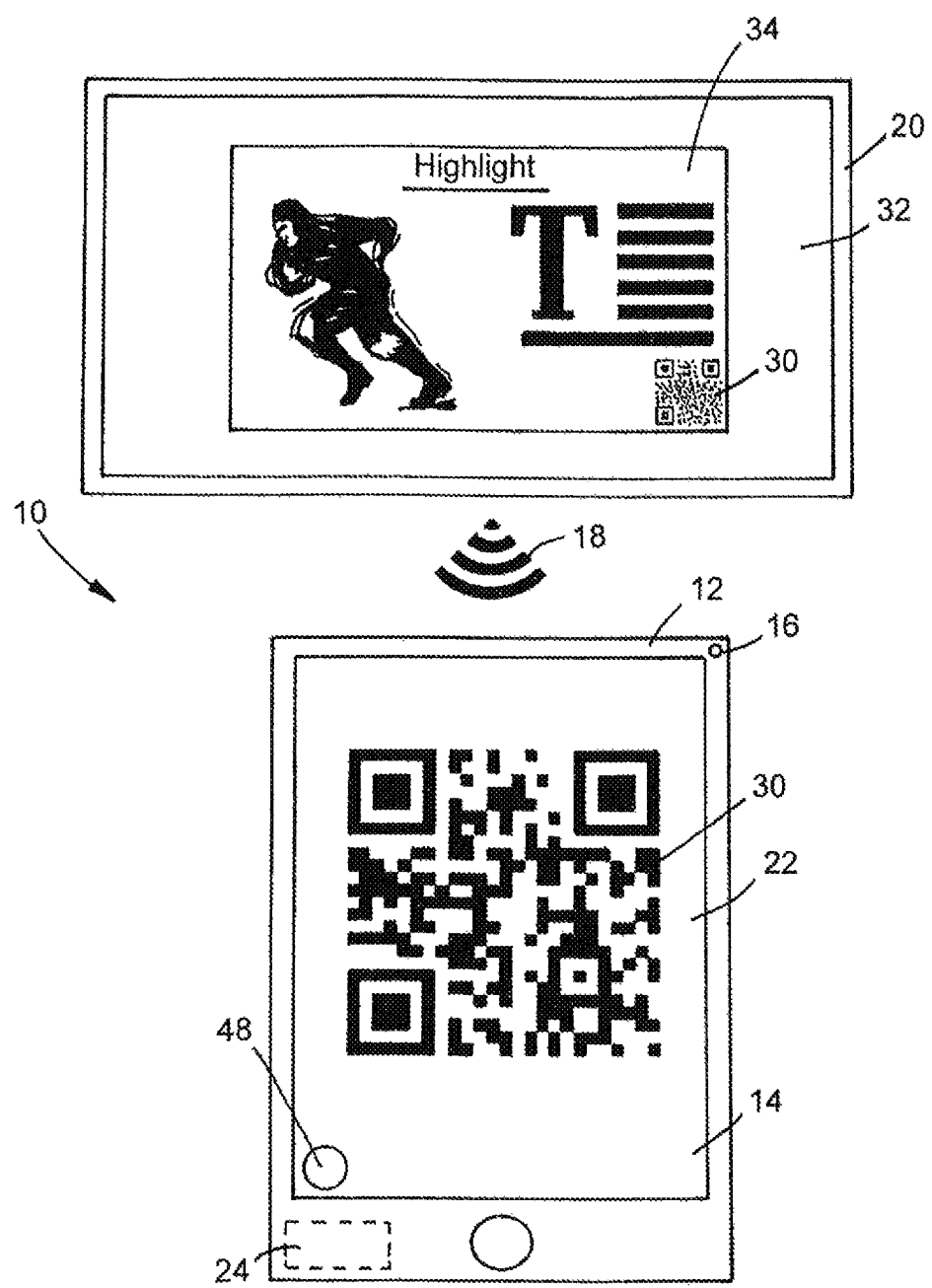
FIG. 1 shows a mobile device operating a virtual trading card system in accordance with the present invention for capturing and storing a virtual trading card.
Figure 2:
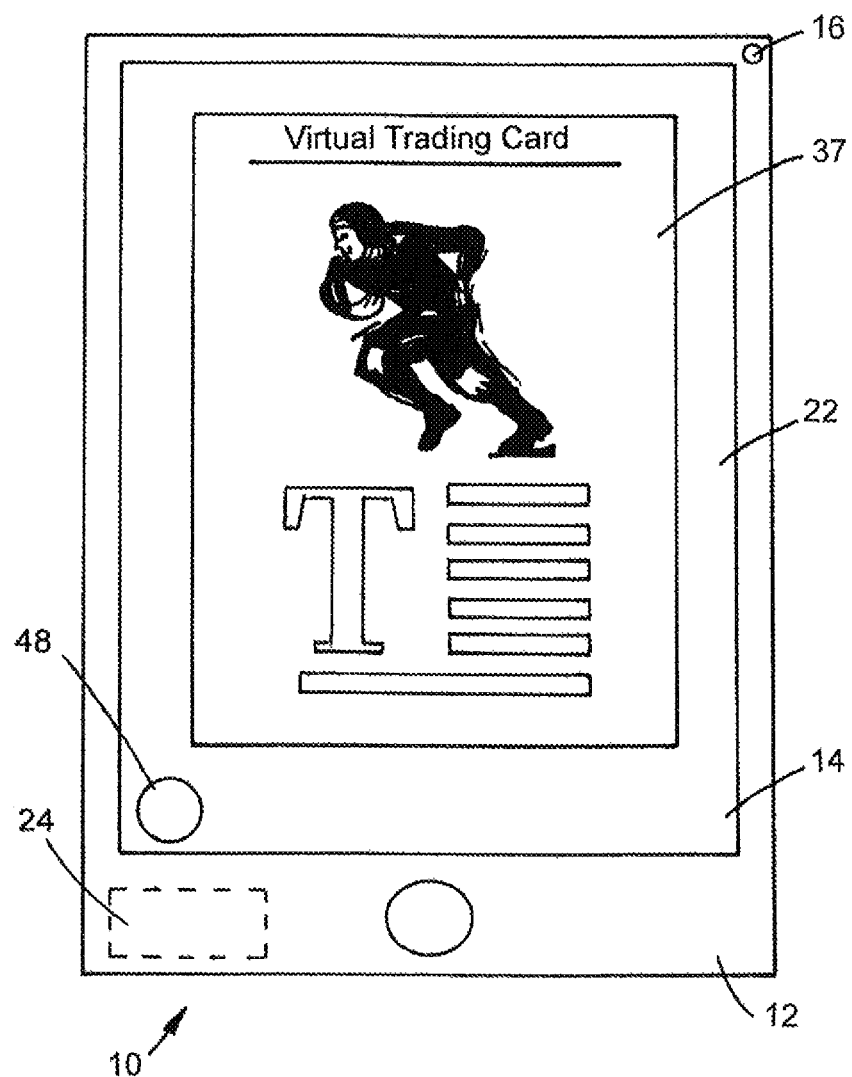
FIG. 2 shows a virtual trading card being displayed on the mobile device.
Figure 3:
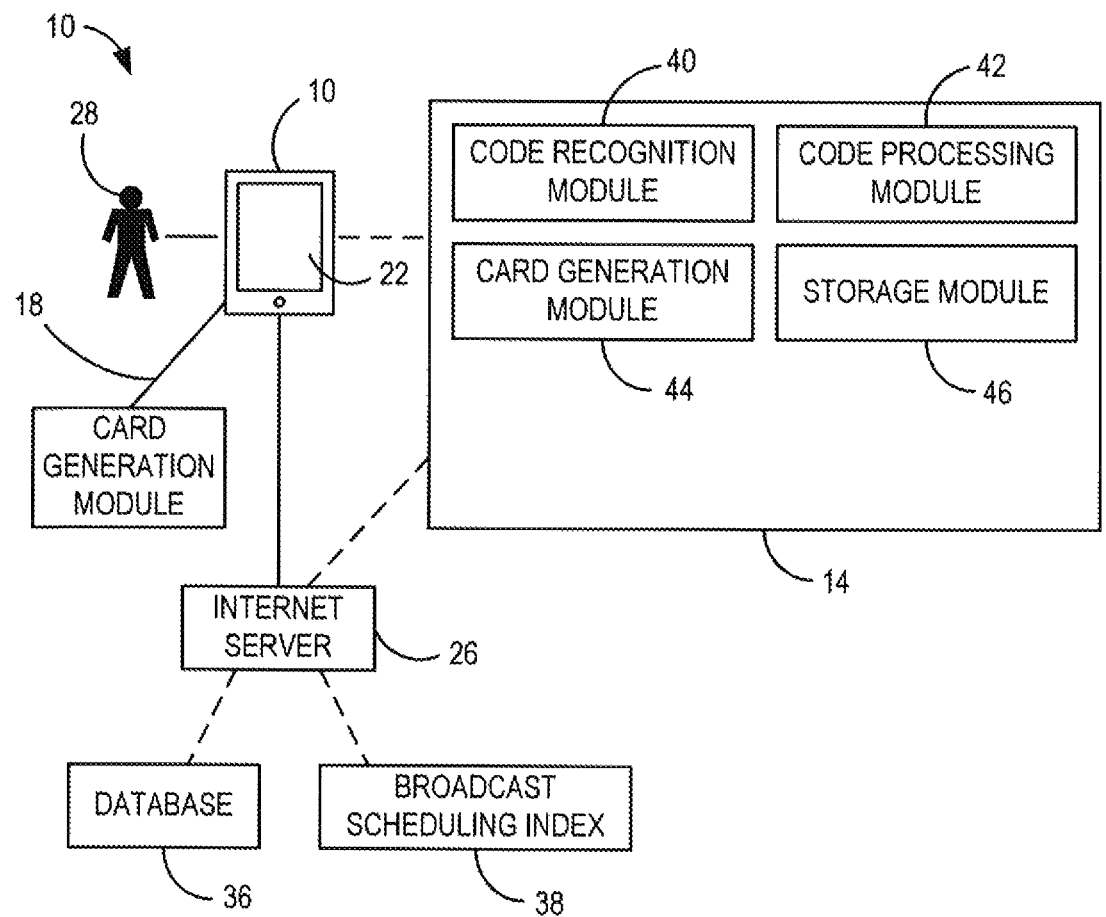
FIG. 3 is a schematic diagram showing the interaction between the virtual trading card system and a television.

Now, and in accordance with a first aspect of the present invention and with reference to FIGS. 1-4 of the drawings, there is provided a virtual trading card system denoted at 10.

The present invention has particular utility in connection with viewing a live broadcast, such as a sporting event. Nonetheless, it is to be understood that the present invention can similarly be used in any number of viewing experiences such as watching a theatrical showing of a movie or the like. For purposes of simplicity, reference will be made to the live broadcast being a sporting event, specifically a football game highlighting a football play, displayed on a television, and alternatively a theatrically presented movie displayed on a movie screen, throughout the ensuing description.

The virtual trading card system 10 enables capturing and storing at least one virtual trading card on a mobile device. The system 10, generally comprises: (a) a mobile device 12; and (b) a downloadable virtual trading card application 14, the virtual trading card application 14 being installed on the mobile device 12.

The mobile device 12 may be a smart phone, tablet computer, laptop computer, digital glasses, or the like. The mobile device 12 includes a camera 16 configured to capturing a video signal 18 from a display 19, such as a television, a movie screen, or the like. The mobile device 12 further includes a display screen 22 for viewing the captured video signal 18 and providing controls for operating the mobile device 12, and a storage unit 24 such as a solid state drive or hard disc drive for saving and storing at least one and, preferably, a plurality of virtual trading cards 37 on the mobile device 12.

The mobile device 12 includes means for accessing an internet server 26 for accessing an electronic application download center such as Google Play on Android devices or the App Store on Apple devices. Means for accessing internet servers are well-known to those skilled in the art and include cellular data, wifi, and other wireless access technologies, and as such shall not be discussed in detail hereinbelow. By accessing the application download center on the mobile device 12, a viewer or user 28 can download and install the above-noted application 14, described in detail below. Alternatively, the virtual trading card application 14 may be downloaded to the mobile device 12 through any other suitable means such as direct connection to a computer or the like. Nonetheless, the mobile device 12 requires a network connection for operating the virtual trading card application 14.

The virtual trading card application 14 provides the ability to recognize a visually displayed code 30 appearing in a live broadcast 32 on the television 20. Preferably, the code 30 is a barcode, either linear or matrix such as a, QR code, EZ code, high capacity color barcode, or the like. These barcodes primarily comprise a plurality of lines or squares printed on a white background which can be scanned by an electronic device, such as the camera 16 of a mobile device 12. The specific configuration or design of the code 30 defines predetermined data embedded therein. As noted below, it is to be understood that creating each code 30 to include the required data specific for each associated virtual trading card 37 is well-known. The code 30 is selected from a plurality of codes 31 wherein each of said plurality of codes is associated with a separate virtual trading card 37.

During the live broadcast 32, a code 30 is temporarily displayed. Preferably, the code 30 appears in a corner of the television 20 as part of the live broadcast 32 in order to avoid distracting other viewers from their viewing experience.

Here, the television 20 displays a live broadcast 32 of a football game. At some predetermined moment, such as on the highlight screen 34 for a previously completed play, the code 30 is displayed on the television 20.

The displayed code 30 is then scanned by the user 28 using the camera 16 and displayed on the display screen 22 of his or her mobile device 12.

In order to identify the presence of the code 30 being displayed on the television 20 showing the live broadcast 32, regardless of the type of barcode scanned, the application 14 includes a code recognition module 40. The code recognition module 40 continually processes the video signal 18 being captured by the camera 16 in order to identify whether a code 30 exists.

Once, a code 30 is identified, a code processing module 42 then analyzes the data within the data stored within that code 30 in order to redirect the mobile device 12 to the internet server 26.

The internet server 26 comprises a database 36 including a plurality of virtual trading cards 37. The database 36 may aggregate the virtual trading cards 37 in a single location or, alternatively, distribute the virtual trading cards 37 between a plurality of individual websites, each website corresponding to a specific code 30 scanned and a specific virtual trading card 37. The virtual trading cards 37 are assigned to individual websites or collectively stored in the database 36, preferably, at the time the codes 30 are created. Thus, the data embedded within the codes 30 properly directs the mobile device 12 to the proper destination in order to retrieve the associated virtual trading card 37.

The internet server 26 further includes, whether fully incorporated as part of the database 36 or separated therefrom, a broadcast scheduling index 38. The broadcast scheduling index 38 comprises the specific date and time of every live broadcast 32 which displays a code 30.

It is to be understood that the dates and times stored in the broadcast scheduling index 38 may include any predetermined dates and times of the live broadcast 32, further including the dates and times of a midnight showing of a movie or any other event.

Based on the specific code 30 scanned by the mobile device 12, the code processing module 42 cross-references the date and time when the code 30 was scanned with the date and time provided in the broadcast scheduling index 38 in order to determine if the code 30 was scanned at the same time as the airing of the live broadcast 32.

A scheduling condition is satisfied where the dates and times are the same or, alternatively, at least substantially similar taking into account broadcasting delays across different locations.

The purpose of cross-referencing the dates and times in order to determine if the scheduling condition is satisfied is to ensure that the user 28 only captures a virtual trading card 37 while watching a live broadcast 32 in real-time, as opposed to watching reruns of old broadcasts or previously recorded broadcasts and scanning a code appearing thereon.

If the code processing module 42 determines that the scheduling condition is satisfied, a card generation module 44 within the application 14 displays the virtual trading card on the display screen 22 of the mobile device 12.

If the scheduling condition is not satisfied, the virtual trading card 37 is not displayed on the mobile device 12. Instead, the card generation module 44, alternatively, displays an error message that informs the user 28 that the code 30 was not scanned at the same time as the airing of the live broadcast 32.

The application 14 further comprises a storage module 46 which stores the virtual trading card 37 on the storage unit 24 of the mobile device 12. Thereafter, the user 28 can view the virtual trading card 37 at a later time without having to rescan the code 30.

The application 14 further includes a menu button 48 which allows the user 24 to access features such as printing out the stored virtual trading card 37 in a tangible medium, sending the virtual trading card 37 to a friend also using the application 14, or any other common features contemplated by one of ordinary skill in the art.

Since QR codes are readily created with any free or premium commercially available QR code generating service the party in control of the live broadcast 32 is permitted to create any number of codes 30 and submit their associated virtual trading cards 37 with accompanying date and time information to the internet server 26.

While the virtual trading card 37 shown includes an image of a football player and lines of text, it is to be understood that the virtual trading card 37 may include any additional information relevant to the live broadcast 32 being viewed or the previously concluded play.

The virtual trading card 37 may include a still image or video segment of the football play that just concluded in order to further highlight the player on the virtual playing card 37. Here, the virtual trading card 37 must include this visual representation of the previously concluded play and be quickly uploaded to the internet server 26 in order for the code 30 to properly provide the virtual trading card 37 when scanned by the user 28.

Further, where multiple virtual trading cards 37 are captured, regarding the same player, each virtual trading card 37 only includes statistics up to the date that the virtual trading card 37 was captured. Thus, the user 28 likely will have multiple virtual trading cards 37 of the same player based on a previously completed play, making each virtual trading card 37 differing in value.

Figure 4:
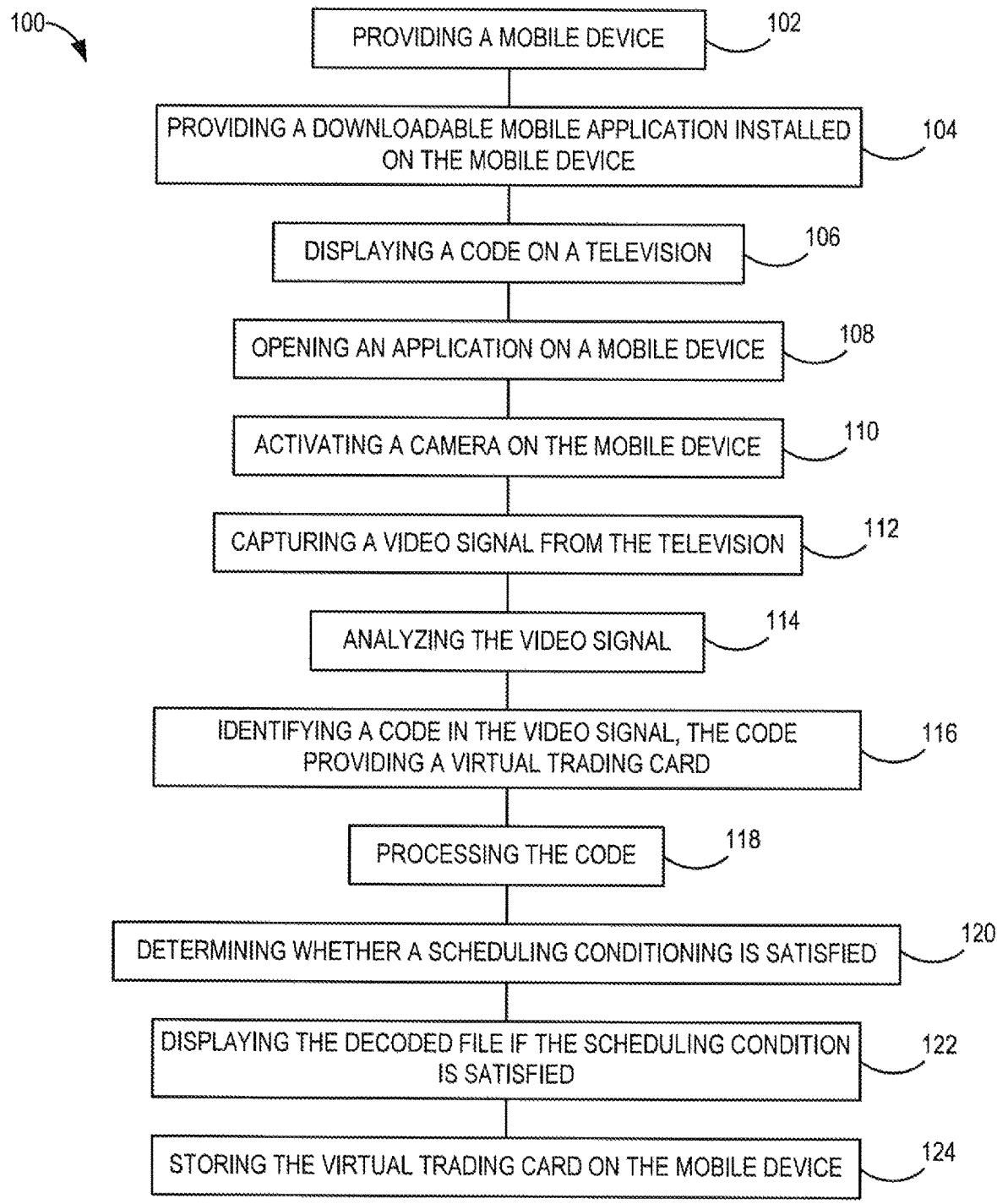
FIG. 4 is a block diagram showing a method for capturing and storing a virtual trading card in accordance with the present invention.

Further, in accordance with a second aspect of the present invention and with reference to FIG. 4 of the drawing, there is depicted a block diagram showing a method denoted at 100 for capturing and storing at least one virtual trading card on a mobile device.

It is to be understood that the mobile device and the application used in accordance with the method 100 described below are the same as like components described in detail above with respect to the mobile device 12 and the application 14.

The method 100, generally, comprises the steps of: (a) capturing a video signal at 112; (b) identifying at least one code being displayed in the captured video signal at 116, the at least one code being associated with a virtual trading card; (c) processing the at least one code at 118; (d) determining whether a scheduling condition is satisfied at 120; (e) displaying the associated virtual trading card if the scheduling condition is satisfied at 122; and (f) storing the associated virtual trading card on the mobile device at 124.

In use and with more particularity, a user provides a mobile device at 102, the mobile device including a camera for capturing a video signal, the video signal including at least one and, preferably, a plurality of codes, the codes being associated with a virtual trading card, a display screen for displaying the associated virtual trading card, and a storage unit for storing the associated virtual trading card.

A downloadable mobile application is also provided at 104, the application being downloadable from an internet server or other suitable medium such as a personal computer or the like.

Initially, a barcode or other code, as described above, is displayed on a television at 106. Once the user visually identifies the code being displayed, the user opens the application on the mobile device at 108. Opening the application activates the camera 106 and captures a video signal from the television at 112.

Once the application is activated, the application carries out the remaining steps by utilizing the mobile device.

The camera continually analyzes the video signal at 114 in order to identify if a code appears. Where a code is provided in the video signal, the application identifies the specific code displayed at 116.

Thereafter, the application processes the specific code at 118 which redirects the mobile device to an internet server including a database of virtual trading cards and a broadcast scheduling index defining dates and times of live broadcasts.

Based on the specific code identified and processed, the application determines whether a scheduling condition is satisfied at 120 by cross-referencing the date and time that the code was scanned with the date and time of the live broadcast based on the information provided in the broadcast scheduling index.

Where the scheduling condition is satisfied, the virtual trading card corresponding to the code scanned is displayed on the display screen of the mobile device at 122.

In order to access the virtual trading card, or any other virtual trading card later captured, the virtual trading card can be saved and stored in the storage unit of the mobile device, as at 124.

Steps 102 to 124 may be repeated throughout the entire live broadcast any number of times based on the duration of the live broadcast and number of codes appearing therein.

Figure 5:
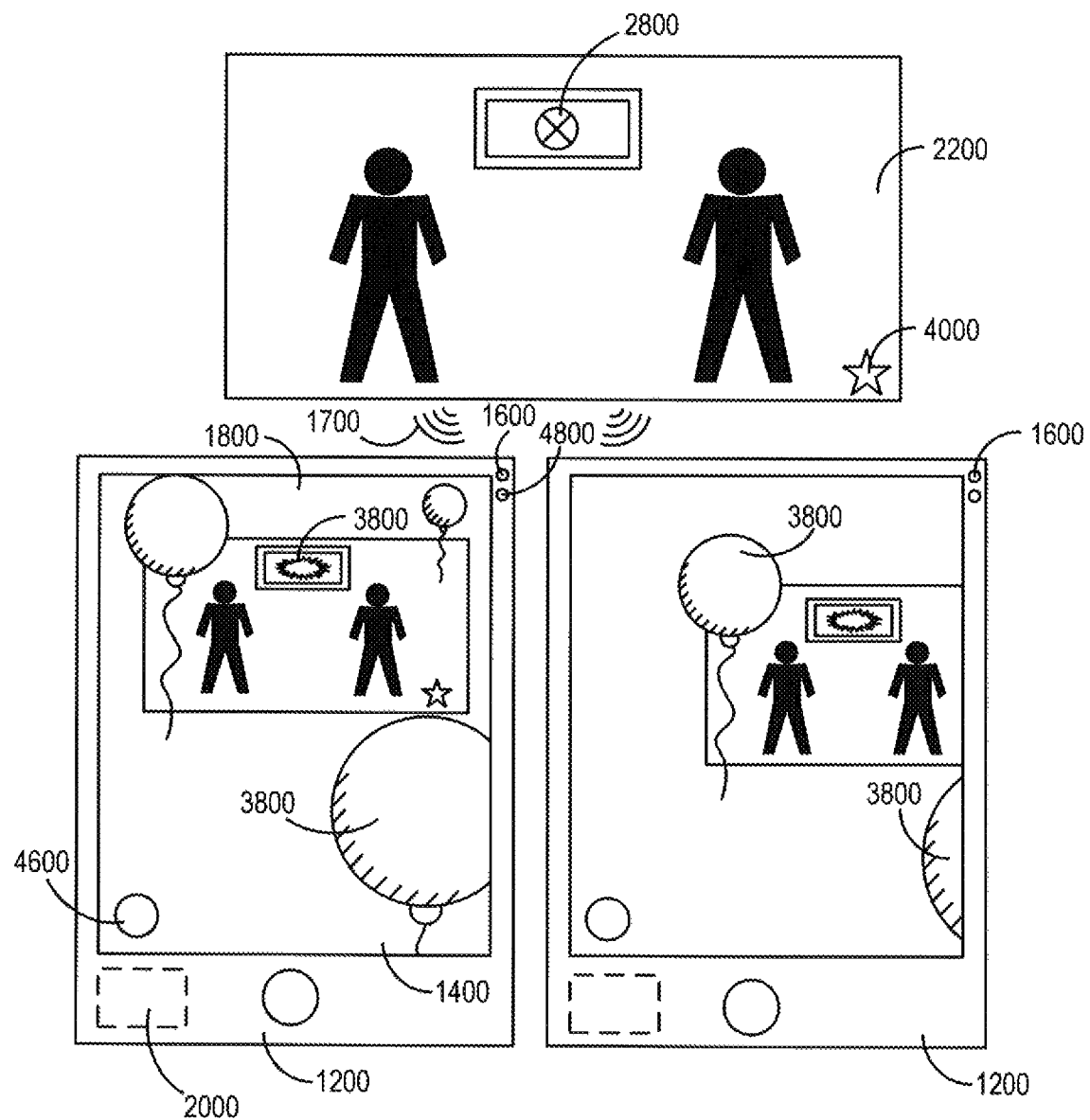
FIG. 5 shows an augmented reality movie system for displaying augmented reality images on a plurality of mobile devices.
Figure 6:
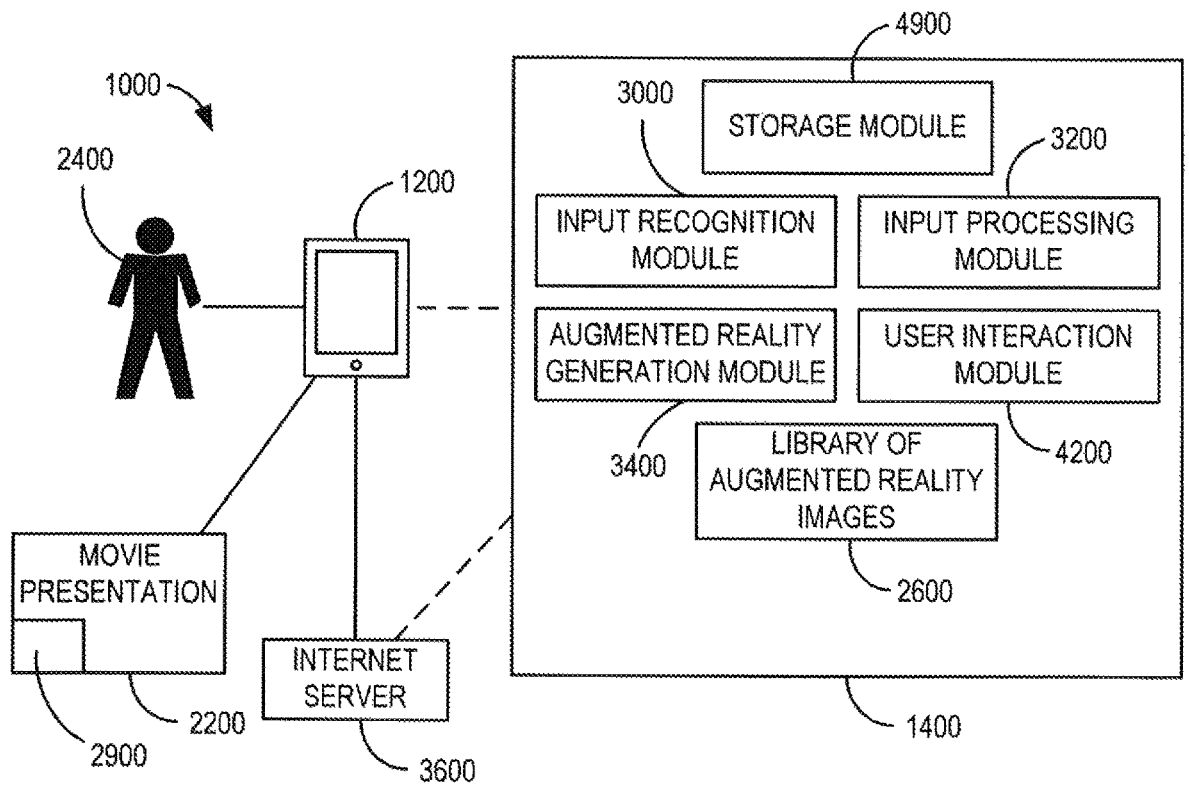
FIG. 6 is a schematic diagram showing the interaction between the augmented reality movie system and a movie presentation.
Figure 7:
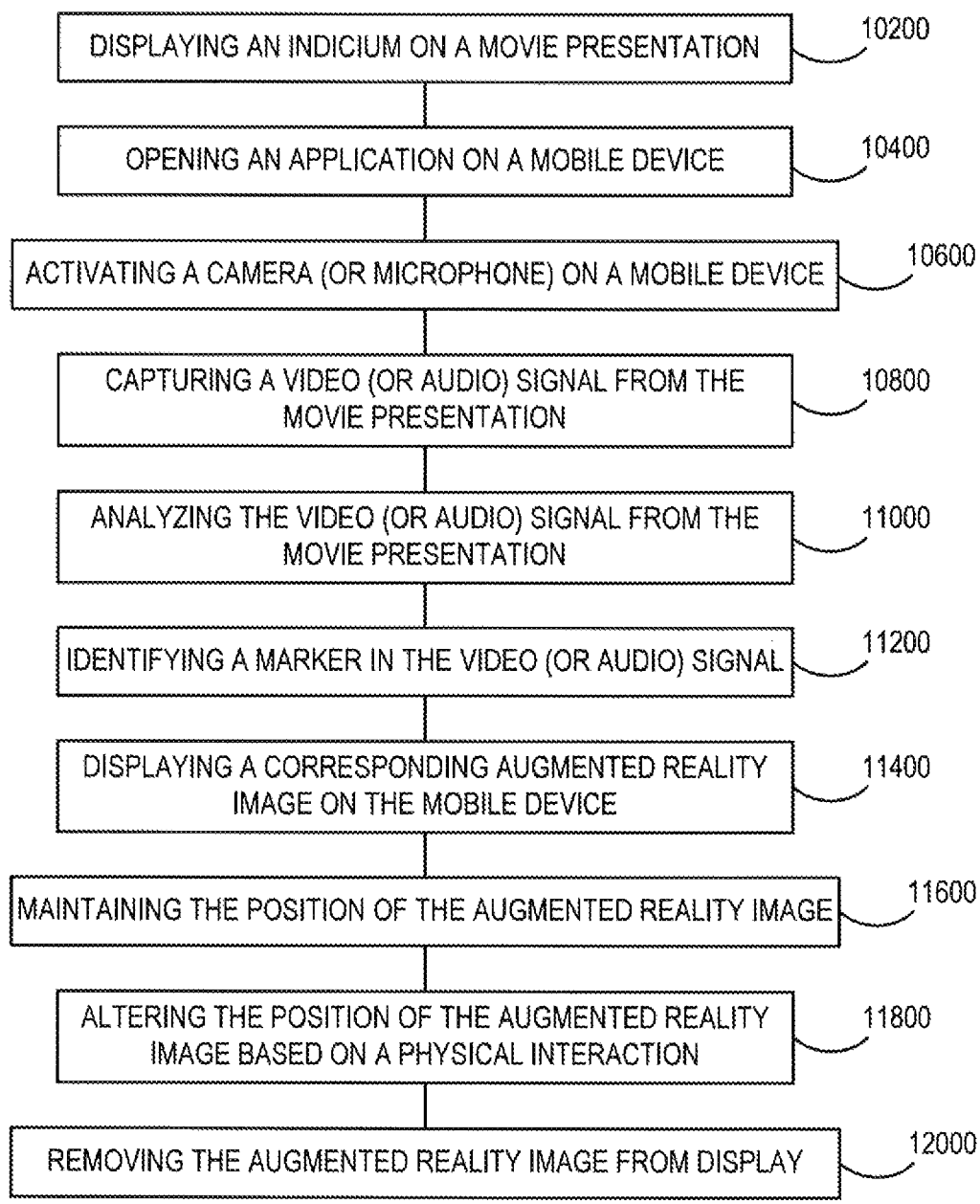
FIG. 7 is a block diagram showing a method for displaying augmented reality images.

Now, and in accordance with a first aspect of the present invention and with reference to FIGS. 5-7 of the drawings, there is provided an augmented reality (AR) movie system denoted at 10 for displaying at least one AR image on a mobile device as a visual overlay atop a captured video signal. The system 1000, generally, comprises: (a) a mobile device 1200; and (b) a downloadable application 1400, the application 1400 being installed on the mobile device 1200.

The mobile device 1200 may be a cellular phone, tablet, laptop, digital glasses, or the like. The mobile device 1200 includes a camera 1600 for capturing a video signal 1700 of a movie presentation 2200, a display screen 1800 for viewing the captured video signal 1700 and operating the mobile device 1200, a storage unit 2000 for saving and storing the captured video signal 1700 to the mobile device 1200, and, optionally, a microphone 4800.

Preferably, the mobile device 1200 is a smart phone that has access to an internet server 3600 for accessing an electronic application download center such as Google Play on Android devices or the App Store on Apple devices. By accessing the application download center on the mobile device 1200, a viewer or user 2400 can download and install the above-noted application 1400, described in detail below. Where the mobile device 1200 does not include a network connection, the application 1400 may be installed on the mobile device 1200 through any other suitable means such as direct connection to a computer or the like.

The application 1400 provides the ability to recognize at least one and, preferably, a plurality of objects or "markers" 2800 appearing in a movie presentation 2200 which is captured in the video signal 1700 by the mobile device 1200. The application 1400 then displays an associated AR image 3800 that can be viewed on the mobile device 1200 itself as a visual overlay atop the video signal 1700.

While viewing the movie presentation 2200, an indicium 4000 is displayed, whether an image, audible alert, or the like, which signals that a marker 2800 is visible, or soon to appear, in the movie presentation 2200 and that the user 2400 should activate the application 1400. Preferably, the indicium 4000 is a visual identifier that appears in a corner of the movie presentation 2200 in order to avoid distracting other viewers from their viewing experience. Further, the indicium 4000 remains present for a predetermined period of time in order to ensure that the user 2400 recognizes its presence or, alternatively, for the entire duration that the AR image 3800 is displayed.

Here, the indicium 4000 appears in the lower right corner of the movie presentation 2200 illustrated as a star.

As noted above, the indicium 4000 may comprise alternative forms of user notifications such as an audible notification or vibration on the mobile device 1200 itself in order to alert the user 24 that he or she should activate the application 1400. This may be found to be less of a distraction to other viewers that may not wish to participate.

The application 1400 includes a library 2600 containing a plurality of AR images 3800 that are downloaded directly onto the mobile device 1200 when the application 1400 is installed. Each of the AR images 3800 includes metadata or a data set of parameters. The data set of each AR image 3800 provides instructions as to the timing, positioning, and movement of each AR image 3800 being displayed on the mobile device 1200. Specifically, these instructions may pertain to the length of time the AR image 3800 is displayed on the display screen 1800, the movement patterns the AR image 3800 exhibits, etc. Further, each AR image 3800 corresponds to an associated marker 2800 temporarily displayed in the movie presentation 2200.

As noted below, when one of the markers 2800 appears within the field of view of the camera 1600 by the mobile device 1200, the corresponding AR image 3800 appears on the display screen 1800 as an overlay atop the video signal 1700. The AR image 3800 then follows the instructions defined by its data set.

Because there may be a large number of AR images 3800, each having their own data set, contained with the application 1400, it is preferred that a separate application pertaining to the specific movie presentation or viewing experience be downloaded for each occasion. This way, only the AR images and data sets required for the upcoming viewing experience are downloaded onto the mobile device 1200, thereby saving space within the storage unit 2000. Additionally, this allows the user 2400 to delete specific applications downloaded on the mobile device 1200 after they have been used or are no longer required.

In order to identify one of the markers 2800 within the movie presentation 2200, the application 1400 includes an input recognition module 3000. Information pertaining to the color, size, shape, and overall appearance of each of the markers 2800 appearing in the movie presentation 2200 is stored within the input recognition module 3000. Thus, the input recognition module 3000 continually processes the video signal 1700 being captured by the camera 1600 of the mobile device 1200 in order to identify whether a marker 2800 exists.

Alternatively, the marker 2800 need not be visually present, but, instead, may be an audible sound that can be recognized and identified by the microphone 4800 in the mobile device 1200.

Once a marker 2800 is identified, an input processing module 3200 within the application 1400 retrieves the AR image 3800 and associated data set corresponding to the identified marker 2800. The AR image 3800, in accordance with the data set, is then prepared for display on the display screen 1800 of the mobile device 1200.

Where the marker 2800 is an audible sound, the input recognition module 3000 identifies the specific audible sound instead of a visual object.

The application 1400 further comprises an AR image generation module 3400 which displays the AR image 3800 retrieved by the input processing module 3200 in accordance with the instructions provided in the data set associated with that specific AR image 3800.

The marker 2800 may appear in various positions either because the marker 2800 is moving within the movie presentation 2200 itself or the mobile device 1200 is moving and, therefore, the field of view of the camera 1600 is changing. Thus, the AR image generation module 3400 works in conjunction with the input recognition module 3000 to continually identify the position of the marker 2800. When the marker 2800 moves across the display screen 18, the AR image generation module 3400 modifies the position of the AR image 3800 in relation to the marker 2800 and in accordance with the positioning information defined in the associated data set. This provides the appearance that the AR image 3800 is interacting with the movie presentation 2200. The AR image generation module 3400 may utilize any movement tracking components in the mobile device 1200 such as a gyroscope, accelerometer, or the like.

Two separate mobile devices 1200, 1200' are shown, each directed at the movie presentation 2200 in a slightly different direction, yet both capturing the marker 2800. Here, the AR images 3800, 3800', appearing as multiple balloons on the mobile devices 1200, 1200', respectively, appear in the same general location with respect to the marker 28 despite an altered view by their camera 1600, 1600'. The AR image 3800 may further include various imagery, illustrated as an explosion-type graphic, being superimposed over the marker 2800 on the mobile devices 1200, 1200'. This may be useful in displaying an AR image 3800 as an overlay directly atop the marker 2800.

Moreover, it is to be understood that the data set may provide additional AR images 3800 that can only be viewed when the mobile device 1200 is turned to a direction where the marker 2800 is no longer within view of the camera 1600. Thus, it may be required that the AR image 3800 continue to be displayed even when the marker 2800 is out of sight. Here, the data set instructs the AR image 3800 to appear for a specific length of time instead of while the marker 2800 is in view.

The application 1400 comprises a user interaction module 4200 which allows for users or other physical objects to virtually interact with the AR image 3800 being displayed. Doing so allows the user 2400 to further interact with the movie presentation 2200. These interactions may include the user 2400 waving his or her hand in front of the camera 1600 as though attempting to touch the AR image 3800 or, alternatively, touching the display screen 1800 of the mobile device 1200 proximate the AR image 3800 appearing thereon. The user interaction module 4200 adjusts the position of the AR image 3800 based on this physical interaction.

Where the physical interaction appears in front of the camera 1600, such as a user 2400 waving his or her hand or other disruption within the field of view of the camera 1600, the user interaction module 4200 works in conjunction with the camera 1600 in order to recognize objects moving within the path of the AR image 3800. For example, when the camera 1600 recognizes an object moving from left to right, the AR image 3800 may similarly move in that direction or appear to be pushed off of the display screen 1800. The same goes for objects moving in any other direction. The data set associated with each AR image 3800 includes instructions on how each AR image 3800 should react based on these physical interactions.

Alternatively, as noted above, a user 2400 may interact with the AR images 3800 via the display screen 1800 of the mobile device 1200 such as by tapping, swiping, and the like within the application 1400 itself. Here, the user interaction module 4200 works in conjunction with the display screen 1800 to identify the manner in which the user 2400 is touching the display screen 1800. Swiping the display screen 1800 in certain directions may cause the AR image 3800 to react in a similar manner as that described above with respect to a user 2400 waving his or her hand in front of the camera 1600.

The application 1400 further comprises a storage module 4400 which allows the user 2400 to save either the displayed AR image 3800 itself or the AR image 3800 in combination with the video signal 1700 being captured. In either instance, the AR image 3800 can be saved to the storage unit 2000 of the mobile device 1200 as a still frame or a video clip. The application 1400 includes a menu button 4600 which allows the user 2400 to navigate the application 1400 and store the AR images 3800. Once the AR image 3800 is saved, it may be later viewed from either the application 1400 or a media player of the mobile device 1200 itself.

It is to be understood that the application 1400 may include restrictions when saving portions of the captured video signal 1700 from the movie presentation 2200 for copyright purposes.

Further, in accordance with a second aspect of the present invention and with reference to FIG. 7 of the drawings, there is depicted a block diagram showing a method denoted at 10000 for displaying an AR image on a mobile device as a visual overlay atop a video signal.

It is to be understood that the mobile device and the application used in accordance with the method 10000 described below are the same as like components described in detail above with respect to the mobile device 1200 and the application 1400.

The method 10000, generally, comprises the steps of: (a) capturing a video signal 10800; (b) identifying a marker being displayed in the captured video signal 11200; (c) displaying one of a plurality of AR images associated with the marker 11400; and (d) maintaining the position of the displayed AR image in relation to the marker 11600.

In use and with more particularity, a user provides a mobile device, the mobile device including a camera for capturing a video signal, a display screen for displaying the captured video signal, a storage unit for storing the captured video signal, and, optionally, a microphone.

A downloadable mobile application including a plurality of AR images is also provided, the application being downloadable from an internet server or other suitable medium such as a personal computer or the like.

Thereafter, the user downloads the application and installs it on his or her mobile device.

Initially, an indicium is displayed on a movie presentation at 10200 and the user opens the application on the mobile device at 10400. Opening the application activates the camera 10600 and captures a video signal from the movie presentation at 10800. Alternatively, the microphone may be activated to capture an audio signal.

The camera continually scans the video signal for an object or marker, such as a picture, basketball, person, or any other identifiable object. While it is understood that it is difficult to identify a marker if the appearance of the marker is changing, caused by lighting changes or movement of the camera, the application is able to recognize the marker so long as a substantial portion of the marker remains static.

While scanning the video signal, the application processes the captured video signal at 11000 until a marker is displayed. Thereafter, the application identifies the marker at 11200 which appears in the movie presentation and displays one of the AR images that is associated with the specifically identified marker at 11400. The AR image appears on the display screen of the mobile device as a visual overlay atop the video signal as if existing within the movie presentation itself.

As the camera continuously processes the video signal and tracks the position of the marker while displaying the AR image, the application maintains the position of the AR image in relation to the marker at 11600. The AR image need not maintain the same position, but at least move with respect to the marker within the display screen of the mobile device.

As noted above, the user may interact with the AR image by either touching the display screen of the mobile device or providing a moving object in front of the camera. Thus, the application alters the position of the AR image based on these physical interactions at 11800 in the same manner described above.

The display of the AR image concludes at 12000 either upon a predetermined amount of time or when the marker is no longer visible. While the user may not be aware of when the marker is visible, it is preferred that the indicium remain on the movie presentation during the entire length of time the AR image is displayed. Once the indicium disappears, it is clear to the user that the displaying AR image has concluded and the user may put away the mobile device. Alternatively, a prompt may appear on the screen of the mobile device indicating that the displaying of the AR image has concluded.

Steps 10200 to 12000 may be repeated throughout the entire movie presentation any number of times based on the length of the movie presentation and number of markers appearing therein.

From the above, it is to be appreciated that defined herein is a new and unique augmented reality movie system and method for displaying augmented reality images as an overlay atop a movie presentation and a new and unique virtual trading card system and method for capturing and storing virtual trading cards on a mobile device while viewing a live broadcast.

The invention claimed is:

1. A virtual trading card system for capturing and storing at least one virtual trading card on a mobile device, the system comprising:
    (a) a mobile device comprising a camera for capturing a video signal, a display screen configured to display a virtual trading card; and a storage unit configured to store the virtual trading card;
    (b) a downloadable mobile application installed on the mobile device, the application comprising (i) a code recognition module configured to identify at least one code being displayed in the video signal; (ii) a code processing module for processing the at least one code and determining if a scheduling condition is satisfied; (iii) a card generation module for displaying the associated virtual trading card on the display screen of the mobile device if the scheduling condition is satisfied; and (iv) a storage module for storing the associated virtual trading card on the storage unit of the mobile device.

2. The virtual trading card system of claim 1 wherein the video signal comprises at least one code associated with the virtual trading card.

3. A method for capturing and storing at least one virtual trading card on a mobile device, the method comprising the steps of: (a) providing a mobile device comprising (i) a camera for capturing a video signal, the video signal including at least one code, the at least one code being associated with a virtual trading card; (ii) a display screen for displaying the associated virtual trading card; (iii) a storage unit for storing the associated virtual trading card; (b) providing a downloadable mobile application for execution on the mobile device; (c) activating the camera on the mobile device; (d) capturing a video signal; (e) analyzing the video signal; (f) identifying the at least one code in the captured video signal; (g) processing the at least one code; (h) determining whether a scheduling condition is satisfied; (i) displaying the associated virtual trading card on the display screen of the mobile device; and (j) storing the associated virtual trading card on the storage unit of the mobile device.

* * * * *